US008958477B2

(12) United States Patent
Boyce et al.

(10) Patent No.: US 8,958,477 B2
(45) Date of Patent: Feb. 17, 2015

(54) MULTIPLE REFERENCE LAYER PREDICTION SIGNALING TECHNIQUES

(71) Applicant: Vidyo, Inc., Hackensack, NJ (US)

(72) Inventors: Jill Boyce, Manalapan, NJ (US); Danny Hong, New York, NY (US); Wonkap Jang, Edgwater, NJ (US)

(73) Assignee: Vidyo, Inc., Hackensack, NJ (US)

( * ) Notice: Subject to any disclaimer, the term of this patent is extended or adjusted under 35 U.S.C. 154(b) by 0 days.

(21) Appl. No.: 14/245,072

(22) Filed: Apr. 4, 2014

(65) Prior Publication Data

US 2014/0301459 A1     Oct. 9, 2014

Related U.S. Application Data

(60) Provisional application No. 61/808,823, filed on Apr. 5, 2013.

(51) Int. Cl.
*H04N 7/12*      (2006.01)
*H04N 7/46*      (2006.01)
*H04N 19/174*    (2014.01)
*H04N 19/105*    (2014.01)
*H04N 19/30*     (2014.01)

(52) U.S. Cl.
CPC ... *H04N 19/00424* (2013.01); *H04N 19/00272* (2013.01); *H04N 19/00024* (2013.01)
USPC ................................. 375/240.12; 375/240.16

(58) Field of Classification Search
CPC .................. H04N 19/00569; H04N 19/00951; H04N 19/00424; H04N 19/00575; H04N 19/00684
USPC ........................................ 375/240.12, 240.16
See application file for complete search history.

(56) References Cited

U.S. PATENT DOCUMENTS

| | | | | |
|---|---|---|---|---|
| 2009/0274214 | A1* | 11/2009 | Yoon et al. | 375/240.16 |
| 2010/0158116 | A1* | 6/2010 | Jeon et al. | 375/240.13 |
| 2011/0293013 | A1* | 12/2011 | Ma et al. | 375/240.16 |
| 2014/0072031 | A1* | 3/2014 | Xiu et al. | 375/240.02 |
| 2014/0092964 | A1* | 4/2014 | Ugur et al. | 375/240.12 |
| 2014/0140399 | A1* | 5/2014 | Seregin et al. | 375/240.12 |
| 2014/0161189 | A1* | 6/2014 | Zhang et al. | 375/240.16 |
| 2014/0192881 | A1* | 7/2014 | Xu et al. | 375/240.16 |

\* cited by examiner

*Primary Examiner* — Anner Holder
(74) *Attorney, Agent, or Firm* — Baker Botts, L.L.P.

(57) ABSTRACT

The disclosed subject matter, in one embodiment, provides techniques to signal inter-layer texture and motion prediction from different direct dependent reference layers. In certain exemplary arrangements, techniques are provided which include one or more syntax elements in a high level syntax structure, e.g., the slice segment header, indicating such different direct dependent reference layer(s).

25 Claims, 7 Drawing Sheets

FIG. 4

Slice segment header:

| slice_segment_header( ) { | Descriptor |
|---|---|
| ... | |
| if( nuh_layer_id > 0 ) { | |
| ... | |
|   if( DependencyId[ nuh_layer_id ] > 0 ) { | |
|   if( NumDirectRefLayers[ nuh_layer_id ] > 1 && | |
|   ( InterLayerTextureRlEnableFlag \| InterLayerMotionPredictionEnableFlag ) ) | |
|     inter_layer_pred_layer_idc | u(v) |
|   } | |
| if( slice_segment_header_extension_present_flag ) { | |
|   slice_segment_header_extension_length | ue(v) |
|   for( i = 0; i < slice_segment_header_extension_length; i++) | |
|     slice_segment_header_extension_data_byte[ i ] | u(8) |
|   } | |
| byte_alignment( ) | |
| } | |

401
402
403 inter_layer_pred_layer_idc specifies that the reference layer picture, rlPic, used for inter layer texture prediction or inter layer motion prediction is the coded picture with nuh_layer_id equal to RefLayerId[ nuh_layer_id ][ inter_layer_pred_layer_idc ]. The number of bits used to represent inter_layer_pred_layer_idc is Ceil( Log2( NumDirectRefLayers[ nuh_layer_id ] ) ). When not present, inter_layer_pred_layer_idc is inferred to be equal to 0.

FIG. 5

| | Descriptor |
|---|---|
| slice_segment_header( ) { | |
| [...] | |
| if( nuh_layer_id > 0 && !all_ref_layers_active_flag && NumDirectRefLayers[ nuh_layer_id ] > 0 ) { | |
|   inter_layer_pred_enabled_flag | u(1) |
|   if( inter_layer_pred_enabled_flag && NumDirectRefLayers[ nuh_layer_id ] > 1 ) { | |
|     if( !max_one_active_ref_layer_flag ) | |
|       num_inter_layer_ref_pics_minus1 | u(v) |
|     if( NumActiveRefLayerPics != NumDirectRefLayers[ nuh_layer_id ] ) | |
|       for( i = 0; i < NumActiveRefLayerPics; i++ ) | |
|         inter_layer_pred_layer_idc[ i ] | u(v) |
|   } | |
| [...] | |
| } | |

501 — slice_segment_header / if
502 — inter_layer_pred_enabled_flag
503 — if( inter_layer_pred_enabled_flag ... )
504 — if( !max_one_active_ref_layer_flag )
505 — num_inter_layer_ref_pics_minus1
506 — if( NumActiveRefLayerPics != ... )
507 — for( i = 0; ... )
508 — inter_layer_pred_layer_idc[ i ]
509 — }
510 — [...]

MULTIPLE REFERENCE LAYER PREDICTION SIGNALING TECHNIQUES

CROSS-REFERENCE TO RELATED APPLICATIONS

This application claims priority to U.S. Provisional Patent Application Ser. No. 61/808,823, filed Apr. 5, 2013, which is incorporated by reference herein in its entirety.

FIELD

The disclosed subject matter relates to video coding, and more specifically, to the representation of information indicative of a reference layer in inter-layer prediction in scalable or multiview video coding based on High Efficiency Video Coding (HEVC).

BACKGROUND

Video coding encompasses techniques where a series of uncompressed pictures is converted into a compressed, video bitstream. Video decoding refers to the inverse process. Standards exist that specify certain techniques for image and video decoding operations, such as ITU-T Rec. H.264 "Advanced video coding for generic audiovisual services", 03/2010, and ITU-T Rec. H.265 "High Efficiency Video Coding", April 2013, both available from the International Telecommunication Union ("ITU"), Place de Nations, CH-1211 Geneva 20, Switzerland or http://www.itu.int/rec/T-REC-H.264 and http://www.itu.int/rec/T-REC-H.265, respectively, and both of which are incorporated herein by reference in their entirety. H.265 is also known as HEVC.

Layered video coding, also known as scalable video coding, refers to video coding techniques in which the video bitstream can be separated into two or more sub-bitstreams, called layers. Layers can form a hierarchy, where a base layer can be decoded independently, and enhancement layers can be decoded in conjunction with the base layer and/or lower enhancement layers. HEVC is planned to include a scalable variant, informally known as Scalable High efficiency Video Coding or SHVC, of which a draft (abbreviated: SHVC-WD1) can be found as JCT-VC-L1008, available from http://phenix.it-sudparis.eu/jct/doc_end_user/current_document.php?id=7279, which is incorporated by reference in its entirety.

SHVC can use inter layer prediction to increase the coding efficiency of enhancement layer(s) by exploiting the redundancy present between the base layer and the enhancement layer. Certain multiview systems can do the same for inter-view prediction. In SHVC, temporal enhancement layers are known as temporal sub-layers not layers. The basic principle of inter-layer prediction in scalable video coding schemes is well understood by a person skilled in the art. In SHVC-WD1, inter-layer prediction for scalability (in contrast to multiview) can be performed by inserting a single (potentially upsampled) predictor reference picture (including some of its meta-data, such as motion vectors) into one or more reference picture list(s) maintained by the spatial or SNR enhancement layer encoder or decoder. An encoder can make use of this inter-layer predictor picture just as of any other reference picture. A decoder uses the predictor when so indicated in the bitstream, just as it uses other predictors when so indicated.

Referring to FIG. 1, shown is a layering structure containing a picture of a base layer (101) and pictures of two enhancement layers (103) and (105). In SHVC, those enhancement layer pictures may be quality/SNR scalable enhancement layers or spatial enhancement layers. In other scenarios, they can be different views of a multiview system. Potential inter-layer prediction is depicted by solid arrows. The enhancement layer picture (105), belonging to the highest enhancement layer, when using inter-layer prediction, may use as an inter-layer predictor (104) information (such as the (upsampled) reference picture(s) itself and associated meta information such as motion vectors) of the closest reference layer picture which, in this case, is enhancement layer picture (103). Enhancement layer picture (103) can use as its inter-layer predictor (102) information from the base layer picture (101). According to SHVC-WD1, enhancement layer picture (105) cannot use base layer picture (101) information directly as a prediction reference.

SUMMARY

The disclosed subject matter, in one embodiment, provides techniques to signal inter-layer texture and motion prediction from different direct dependent reference layers. In certain exemplary arrangements, techniques are provided which include one or more syntax elements in a high level syntax structure, e.g., the slice segment header, indicating such different direct dependent reference layer(s) or view(s).

BRIEF DESCRIPTION OF THE DRAWINGS

Further features, the nature, and various advantages of the disclosed subject matter will be more apparent from the following detailed description and the accompanying drawings in which:

FIG. 4 shows a syntax diagram in accordance with an exemplary embodiment of the disclosed subject matter;

FIG. 5 shows a syntax diagram in accordance with an exemplary embodiment of the disclosed subject matter;

Figure 1:
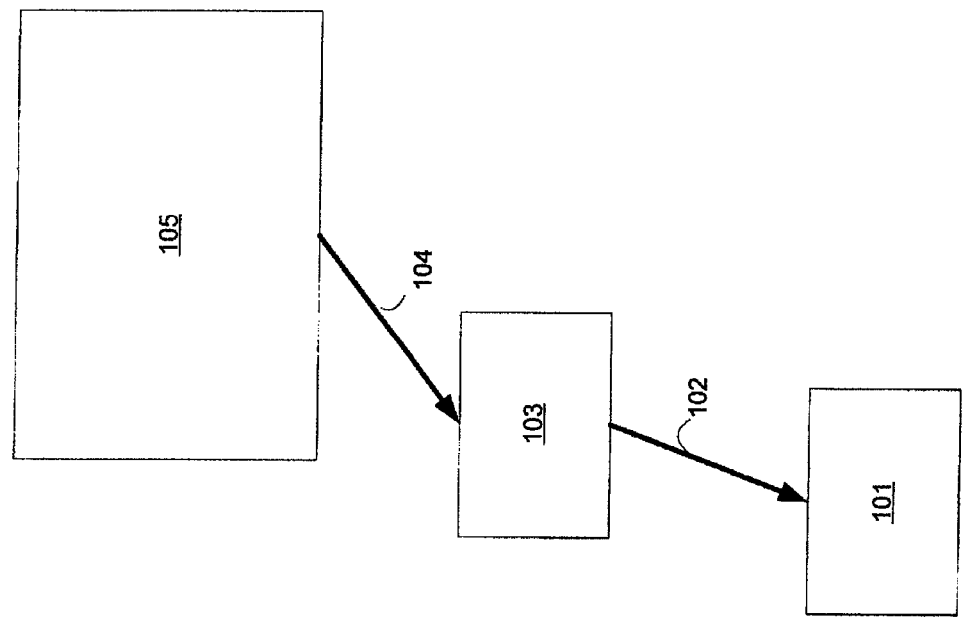
FIG. 1 shows a layering structure in accordance with Prior Art.

The Figures are incorporated and constitute part of this disclosure. Throughout the Figures the same reference numerals and characters, unless otherwise stated, are used to denote like features, elements, components or portions of the illustrated embodiments. Moreover, while the disclosed subject matter will now be described in detail with reference to the Figures, it is done so in connection with the illustrative embodiments.

DETAILED DESCRIPTION

The disclosed subject matter provides techniques for decoding a bitstream that has at least three layers or views, each including at least one picture, P0, P1 and P2, respectively. Without any explicit inter-layer prediction data in the bitstream, the disclosed techniques provide for the prediction of P2 from P1 and P1 from P0. In an exemplary embodiment, a method includes decoding a slice segment header of P2 and reconstructing at least one sample of P2 using information from P0 as a predictor.

In certain scalable coding bitstream syntax, when inter-layer prediction is being used for scalability, the reference picture is implicitly selected (in contrast to explicitly indicated in the scalable bitstream). The reference picture can be the timewise corresponding picture from the closest reference layer. This is henceforth called "implicit reference layer" or "implicit reference layer picture" or "implicit reference layer relationship", depending on context.

In at least some scenarios, depending, for example, on the content to be scalable coded video bitstream or on the application, it can be desirable to provide the scalable or multiview video encoder with the flexibility to select for inter-layer prediction information from one or more layer(s) or view(s) other than the implicit reference layer (if any). There are number of use case scenarios in which such a selection of reference layers can be helpful for coding efficiency or other purposes. For example, when a reference layer (of spatial/SNR scalability) contains temporal sublayers, an encoder may choose not code the reference layer at the full frame rate (for example by not coding, or not sending, the highest temporal sublayer). In such a case, and assuming that the enhancement layer is to be coded at full frame rate, no inter layer prediction is possible for certain enhancement layer pictures because the corresponding reference layer pictures are not available—they belong to the not coded/transmitted temporal sub-layer of the reference layer. Not allowing inter-layer prediction for such pictures can have negative consequences for the coding efficiency.

In order to explicitly select information for inter-layer prediction from reference layer pictures other than the implicit reference layer pictures (henceforth: "explicit reference layer" or "explicit reference layer picture(s)", or "explicit reference layer relationship", depending on context), additional syntax is required in the video bitstream.

Figure 2:
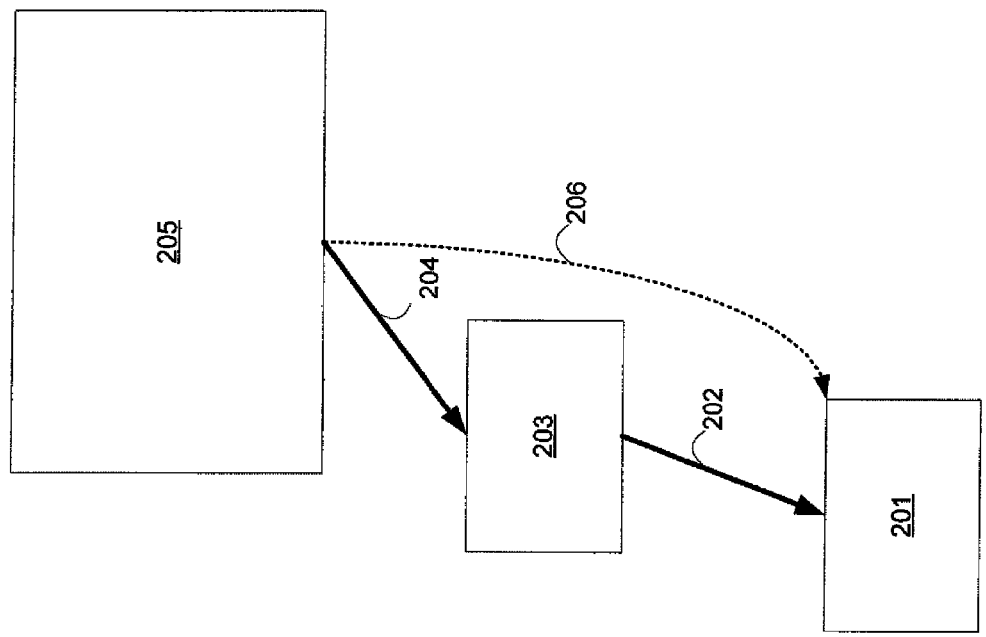
FIG. 2 shows a layering structure in accordance with an exemplary embodiment of the disclosed subject matter.

FIG. 2 shows an example. Similar to FIG. 1, depicted are three spatial/SNR scalable layers pictures or views (201, 203, 205). The implicit reference layer picture relationships, depicted by solid arrows (202, 204), are the same as in FIG. 1. However, in addition, according to an embodiment of the disclosed subject matter, the encoder has the option to express one or more explicit reference layer, shown as a dashed arrow (206). Here, a picture of the higher layer (205) can explicitly make reference to a picture of reference layer other than the implicit reference layer (203); in this case, to the base layer (201).

Figure 3:
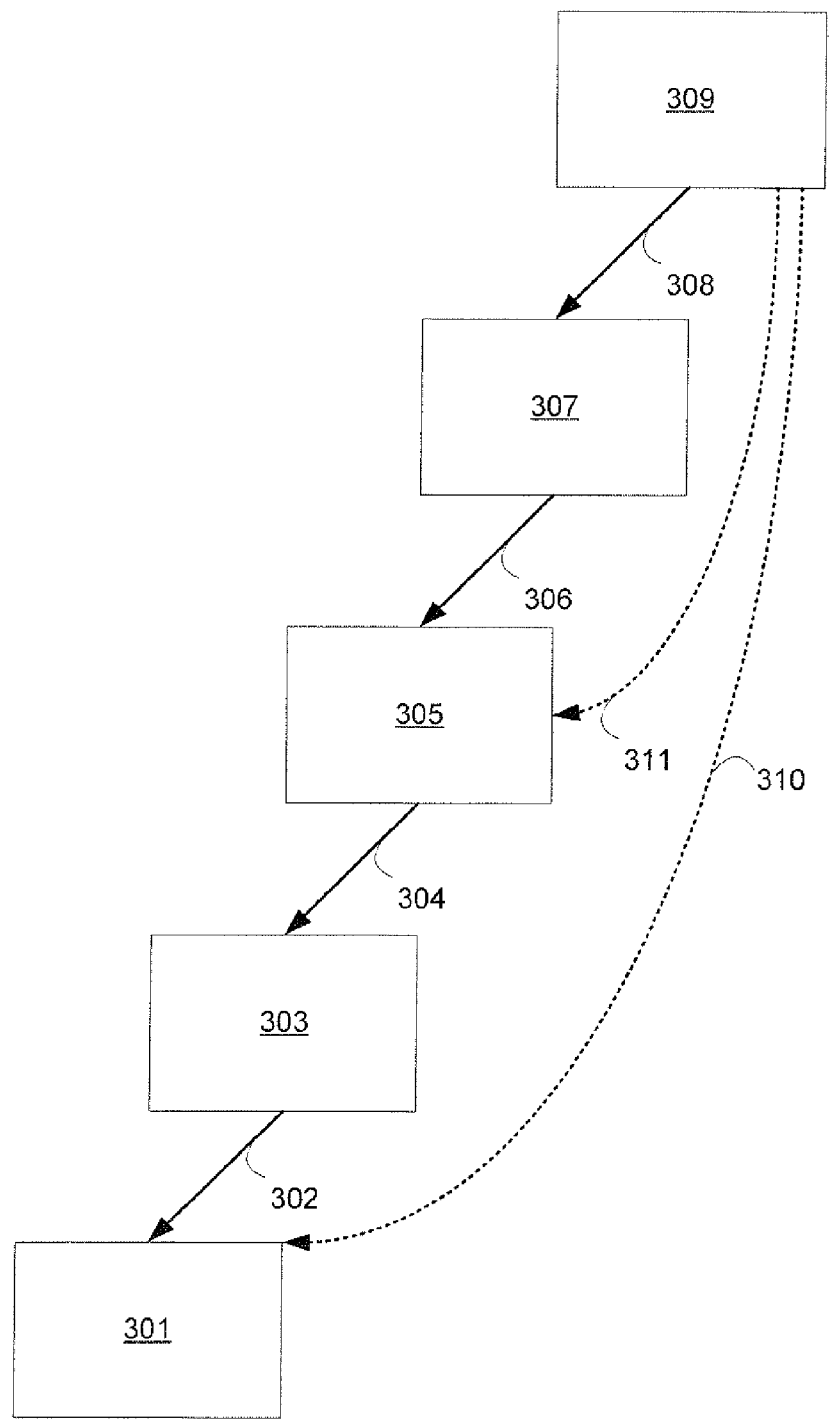
FIG. 3 shows a layering structure in accordance with an exemplary embodiment of the disclosed subject matter.

As SHVC-WD1 supports up to seven enhancement layers, more complex relationships can occur. FIG. 3 shows a more complex example. Shown are one base layer picture (301) and four enhancement layer pictures (303, 305, 307, 309), all with a hierarchical dependency as shown by implicit reference picture dependency solid arrows (302, 304, 306, 308). Briefly put, a picture of enhancement layer n according to SHVC-WD1 uses the picture of enhancement layer n−1 as an implicit reference picture except for enhancement layer 1, which uses the base layer picture for inter-layer prediction reference.

In addition, shown are two explicit reference layer relationships. First, through an explicit inter-layer prediction relationship (310)—shown as a dashed arrow—the highest enhancement layer picture (309) can be using the (potentially upsampled) base layer picture (301) for prediction. Second, the highest enhancement layer picture (309) can further use one of the interim enhancement layer pictures, here the (potentially upsampled) enhancement layer picture (305) for prediction (311). Note that in this example, the enhancement layer picture (309) cannot use enhancement layer picture (303) for inter-layer prediction. Whether or not the implicit reference layer picture (307) can be used for inter-layer prediction is dependent on decisions in the standards committee. Either option is technically feasible and has advantages in some scenarios, and disadvantages in others. Based on the example, it should be understood that a) there can be multiple explicit inter-layer prediction relationships for a given enhancement layer picture (here: 2), and b) that there may be fewer inter-layer prediction relationships than the total number of reference layers in use (here 4 versus 2).

Figure 6:
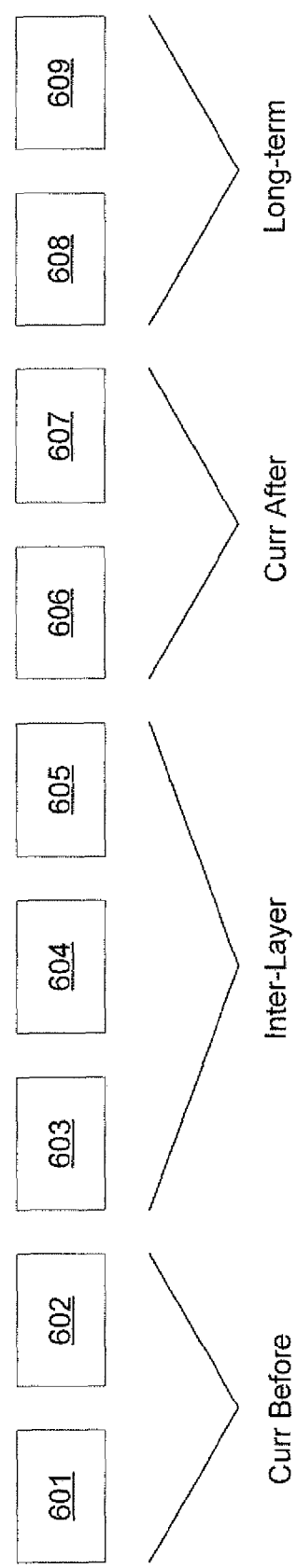
FIG. 6 shows a snapshot of a reference picture list in accordance with an exemplary embodiment of the disclosed subject matter.

The referencing mechanism can consist of inserting one or more (potentially upsampled) reference pictures and their some of their associated metadata (such as motion vectors) containing information from the non-implicit reference layers into a reference picture list. Referring now to FIG. 6, shown is a snapshot of an exemplary layout of one of the reference picture lists maintained by an encoder or decoder at a given time. The reference picture list contains references to, for example, a maximum of 16 reference pictures. Those pictures can, for example, be reference pictures of the same layer located in time before the picture currently being encoded or decoded (Curr Before, 601, 602), reference pictures from other layers explicitly signalled in accordance with the disclosed subject matter (inter-layer, 603, 604, 605), reference pictures from the same layer located later in time relative to the picture currently being decoded (forward reference, curr after, 606, 607), and/or long-term reference pictures (608, 609). It should be noted that there is not necessarily a requirement for reference pictures of all categories to be present, nor that those reference pictures are grouped according to categories. It can be a sensible design and/or encoder choice to allocate reference pictures of the different categories intermixed.

As reference picture referencing is a function that can be implemented at treeblock level, an efficient representation the reference picture referred to by the treeblock can be relevant to coding efficiency. In the treeblock syntax, an entropy code can be used that takes very few bits for those reference pictures likely to occur (i.e., a most recent reference picture), whereas an unproportionally larger amount of bits can be acceptable for the much less likely occurrences of, for example, long term reference pictures. The reference picture list can be ordered in accordance with these codeword lengths, placing frequently referenced reference pictures at the start of the list and less frequent ones at the end.

Obviously, the fewer entries there are in the reference picture list, the shorter the average codeword size can be for all entries. Accordingly, the number of entries should be minimized for good coding efficiency to the number of reference layer pictures that are active (in the sense of being in use at least occasionally) rather than to all reference pictures that are theoretically useable in a given layering structure. In the context of FIG. 3, it was already shown that, according to the same or another embodiment, explicit inter-layer reference relationships can be omitted. Briefly referring to FIG. 3, for example, there is no explicit inter-layer prediction reference between layer (309) and (303). This implies that no entry in the reference picture list would be required for the reference picture of layer (303) when decoding layer (309), which in turn shortens the reference picture list by one entry, overall reducing the average codeword length when referencing into reference pictures at the treeblock level. With modern adaptive entropy coding schemes, the bitrate saving may not be as impressive as they can be when using straightforward VLC coding, but some gain is still to be expected.

This insertion, and the use of these reference picture(s) stemming from non-implicit reference layers, can follow the same design principles, syntax, and decoding mechanism as available for the decoding of implicit reference layer pictures and multiple reference pictures, both of which are known in the art. Similarly, constraints such as necessary memory bandwidth requirements may not increase in a significant way because the encoder can still be constrained in the use of a certain total number of reference pictures—the more reference pictures it chooses to take through inter-layer prediction, the fewer it has available for in-layer prediction (which are useful, for example, for temporal scalability or for coding efficiency based on multipicture prediction). Alternatively, the number of available potential reference picture can increase over the number of reference pictures used for in-layer prediction, but by a fixed amount, e.g., the maximum number of enhancement layers (7 in SHVC). Insofar, the increase of both implementation and computational complexity can be kept low and predictable.

Described now are the mechanisms that allow an encoder to indicate, in the scalable bitstream and more specifically in the part of the scalable bitstream covering the enhancement layer currently being decoded, explicit reference layer relationships.

In order to keep the syntax overhead for explicit signalling of explicit reference layers low, a number of design considerations can be taken into account:

(1) Location of the syntax for explicit signalling in the overall SHVC syntax structure. As this syntax can directly influence the decoding process, for example by making available certain reference pictures for prediction, in order to stay aligned with general design principles of HEVC and SHVC, the syntax can advantageously be located in parameter sets, slice segment headers, or similar high level syntax structures that are used by the decoding process (henceforth: normative high-level syntax). High-level syntax structures not used by the decoding process, such as Supplementary Enhancement Information (SEI) messages or the Visual Usability Information (VUI) parameters, may be inadequate because an SHVC decoder is free to ignore those during the decoding process.

(2) Of the normative high level syntax, one or more parameter set types (such as, for example, video parameter set (VPS), sequence parameter set (SPS), or picture parameter set (PPS)) can be used to indicate the presence or absence, or the amount, of explicit reference layer signalling. Such information can for example be in the form of flags that gate the presence or absence directly, or it can be implicit, for example based on bitstream properties (such as the number of enhancement layer in the scalable bitstream, as indicated through one or more syntax elements in the VPS). For example, the VPS can include a flag max_one_active_ref_layer_flag that can indicate only a single active reference layer.

(3) There may be no need for explicit signalling when there is only one reference layer. In this case, one can implicitly assume inter-layer prediction from this single reference layer.

(4) Alternatively, the non-presence of explicit signalling information can imply that no inter-layer prediction is being used. This option can allow simulcast-like bitstreams in which an enhancement layer can be coded independently from any other layer (including the base layer) of the scalable bitstream. It is however noted, that there are many other design alternatives that can be used to achieve this goal.

(5) The maximum number of reference pictures that can be used for inter-layer prediction can be constant and standardized, and can be, for example one. That would imply that the implicit reference layer can be exchanged through explicit signalling to a maximum of one explicitly signalled reference layer.

(6) Alternatively, the maximum number can be signalled as a parameter. At the expense of one additional syntax element (that can potentially co-serve as a gating syntax element for the explicit reference layer syntax element), more than one explicit reference layer syntax elements can be included. The presence of the additional syntax element can itself be gated, for example by a flag.

(7) In order to keep the signalling overhead of those syntax elements low, many different techniques can be employed alone or in combination. For example: a) the syntax elements representing the explicit reference layer(s) can be coded using a variable length code ue(v), which can keep the length of the syntax element(s) small for small values (which are more likely in less complex scalable bitstreams).

(8) The choice of the high-level syntax structure to carry the aforementioned syntax element(s) may include:

a) slice segment header: allows the highest amount of flexibility (change of inter-layer prediction pictures per slice—or, when an appropriate constraint is standardized, per picture—but at the biggest bit rate cost. No re-sending of parameter sets necessary. The remainder of this description assumes the slice segment header, and further assumes that a constraint requires that the relevant information is the same for all slice segment headers in a given picture.

b) Picture parameter set or similar picture-level structure. In SHVC-WD1, all parameter sets have in common that they cannot be partially updated. Accordingly, the change of a single syntax element in such a parameter set requires the decoding (and, in at least some scenarios, sending and transmission) of the complete parameters including all unchanged parameters. Insofar, the bit rate cost can be substantial if the explicit reference layer syntax elements need to be updated more than occasionally—which would, for example, be the case for the combination of temporal and SNR/spatial scalability that was already described. On the other hand, if such syntax elements can be expected to stay constant for many (hundreds) of pictures, bit rate savings over method a) may be realized.

c) Sequence or Video parameter sets. Here, there is typically no adaptivity except at point in time of sequence parameter set activation, which may occur rarely.

With these design considerations in mind, a few design options are now described. They add syntax elements to the SHVC slice segment header to signal inter-layer texture and motion prediction from different direct dependent reference layers. It should be emphasized that other high level syntax structures may equally be adequate for the placement of the syntax elements described below. Further, it may also be adequate to place those syntax elements into different high level structures, keeping in mind, for example, their likelihood of change. Only one such variant is standardized, though; otherwise, it may be required to signal the variant being used, for example through a profile.

Referring to FIG. 4, according to an aspect of the disclosed subject matter, a conditional syntax element inter_layer_pred_layer_idc (403), shown in bold font as common for HEVC syntax diagram, can be added in, for example, the slice segment header to indicate which of the one or more directly dependent reference layers (that may be signalled in the VPS) is used for inter-layer prediction when decoding a slice in a spatial/SNR enhancement layer. Inter_layer_pred_layer_idc (403) can be present in a spatial/SNR enhancement layer, when a condition DependencyId[nuh_layer_id]>0 (401) is true. This condition may express that the layer currently being decoded (where the slice segment header carrying the syntax elements belongs to, with a layer number nuh_layer_id) an enhancement layer rather than the base layer, and may have a layer it depends on.

In the same or another embodiment, the syntax element inter_layer_pred_layer_idc may only be present when inter-layer prediction is enabled, either for texture prediction or motion prediction, as indicated by the InterLayerTextureRlEnableFlag and InterLayerMotionPredictionEnableFlag variables (402). This can avoid spending unnecessary bits in case when inter-layer texture prediction and inter-layer motion prediction are not enabled, in which, as already described, inter_layer_pred_layer_flag can be meaningless.

An additional condition for presence of inter_layer_pred_layer_idc can be that the VPS indicates the presence of more than one direct dependent reference layer (402), using the NumDirectRefLayers[nuh_layer_id] variable, the value of which in SHVC-WD1 is derived from syntax elements in the VPS). If there were only a single dependent reference layer, there may be no need to signal that layer, such that signalling would mean wasting bits, which would reduce coding efficiency.

If NumDirectRefLayers[nuh_layer_id] is equal to 0, there are no layers available for inter-layer prediction, and if NumDirectRefLayers[nuh_layer_id] is equal to 1, there is only one layer available for inter-layer prediction. For both of those cases, the inter_layer_pred_layer_idc syntax element does not need to be included in the slice segment header syntax structure, because it is unnecessary, saving bits in each enhancement layer slice header vs. the method used in SVC which is signalled in all enhancement layer slices.

The mechanism described above allows for the explicit signalling of a single explicit reference layer. In the form described, it does not allow the signalling of multiple explicit reference layers.

In another aspect of the disclosed subject matter, a somewhat more complex and efficient approach can be taken that allows multiple explicit reference layers.

Referring to FIG. 5, shown is the syntax in the notation well known to person familiar with H.265. The syntax diagram can be an excerpt from the syntax diagram of the slice segment header, and the semantics description can also be an excerpt from the corresponding slice header segment semantics description.

The syntax introduces three conditionally present syntax elements (depicted in bold fonts in FIG. 5), namely inter_layer_pred_enabled_flag (502), num_inter_layer_ref_pics_minus1 (505), and inter_layer_pred_layer_idc[i] (508). The conditional logic can be as follows:

A first condition (501) can gate the presence of all three syntax elements. These condition can include, for example, a requirement that the currently decoded layer is not the base layer (nuh_layer_id>0), and the number of direct reference layers to the layer currently being decoded be larger than 0, i.e. that there is at least one layer upon which this layer depends on. Other conditions may also be present that may be related to multiview coding. If this first condition is true, inter-layer prediction (implicit or explicit) is at least an option for the encoder. If it is false, there is no inter-layer prediction and, therefore, no need to signal any inter-layer prediction data. All remaining syntax shown in FIG. 4 is gated through this condition, as shown by closing curly bracket (510).

If above condition is true, a single bit flag inter_layer_pred_enabled_flag (502) can be included in the bitstream. This flag can indicate that inter-layer prediction in general is enabled in the scalable bitstream for this layer.

Condition (503) gates the presence of explicit prediction layer references control information, specifically the conditional presence of syntax elements num_inter_layer_ref_pics_minus (505) and inter_layer_pred_layer_idc (508), as shown by the curly closing bracket (509). The condition (503) is true if a) inter layer prediction is in use, as determined by the setting of the inter_layer_pred_enabled_flag (502), and the number of direct reference layers for the layer currently decoded is larger than I. The purpose of the latter sub-condition is to avoid the inclusion of explicit layer prediction control syntax elements when there is only a single reference layer, because when there is only a single such layer, there is no need for explicit signalling. This subcondition is similar to the already described first subcondition of condition (402) of FIG. 4.

At this point in the syntax, it has been established that inter-layer prediction with more than one reference layer is in use for the decoding of the current layer.

Condition (504) and syntax element num_inter_layer_ref_pic_minus1 (505), in concert, establish the number of reference layers for which explicit reference layer prediction information can be included. The max_one_active_ref_layer_flag in condition (504) can be located in a parameter set and can be used to signal to the decoder that there will be only a single reference layer (despite of the complexity of the scalable bitstream that can justify more than one such reference layer—which was checked in conditions (501) and (503). Only if that flag is not set (504), the syntax element num_inter_layer_ref_pics_minus1 (505) is included and sets the number of reference layers for which explicit signalling is used.

Condition (506) checks that there are more potential reference layers in the bitstream which can be used for reference in the decoding of the current layer, than the number of reference layers that were signalled in syntax element (505). If the encoder chooses to use all reference layers for potential inter-layer prediction simultaneously, there is no need to explicitly map those reference layers to reference pictures, as they all get mapped to their respective default positions.

If condition (506) is true, explicit mapping is required. In that case, loop (507) runs over the number of active reference layer pictures, and assigns, for each of those active reference layer pictures, information pertaining to the reference layer. The precise calculation for this assignation can be shown in the semantics associated with the syntax of FIG. 5, and can be, for example, as follows:

for (i=0,j=0;i<NumActiveRefLayerPics;i++)

RefPicLayerId[i]=RefLayerId[nuh_layer_id][inter_layer_pred_layer_idx[i]];

The choice of entropy coding mechanism for each of the syntax elements relevant for explicit signalling of reference layers can be important to the size of the slice header and, therefore, for the compression efficiency of the layered bitstream. For a flag such as the inter_layer_pred_enabled_flag, a single bit as expressed by u(1) (502) can be adequate. As the numbering range of both num_inter_layer_ref_pics_minus1 (505) and inter_layer_pred_layer_idc (508) is finite and derivable by the decoder from values in the parameter sets, a binary representation of variable length as needed (determined by using the parameter set values) can be the most efficient option. Accordingly, these syntax elements are coded as u(v).

Computer System

The methods for video coding and decoding, described above, can be implemented as computer software using computer-readable instructions and physically stored in computer-readable medium. The computer software can be encoded using any suitable computer languages. The software instructions can be executed on various types of computers. For example, FIG. 7 illustrates a computer system 700 suitable for implementing embodiments of the present disclosure.

Figure 7:
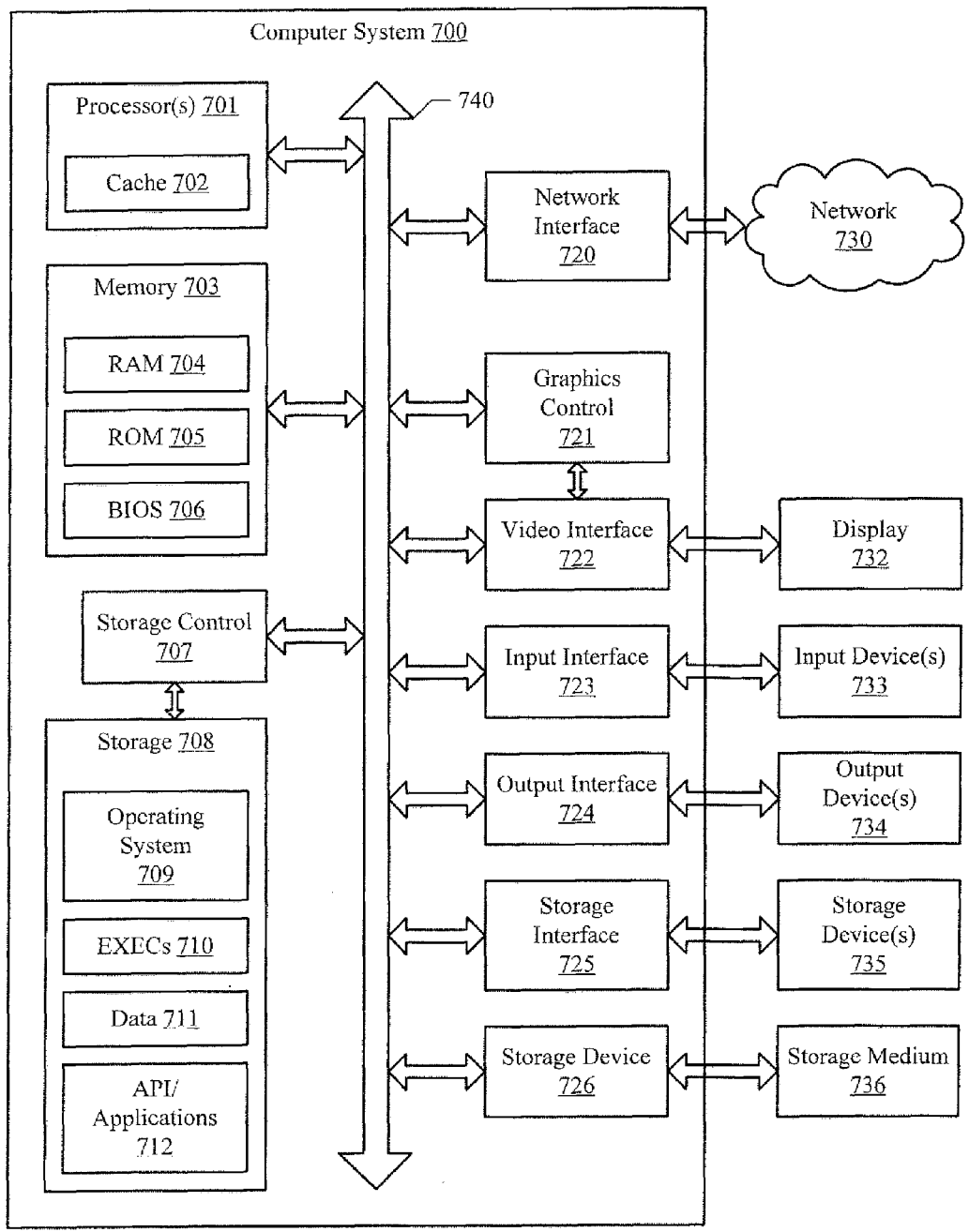
FIG. 7 shows a system in accordance with an exemplary embodiment of the disclosed subject matter.

The components shown in FIG. 7 for computer system 700 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system. Computer system 700 can have many physical forms including an integrated circuit, a printed circuit board, a small handheld device (such as a mobile telephone or PDA), a personal computer or a super computer.

Computer system 700 includes a display 732, one or more input devices 733 (e.g., keypad, keyboard, mouse, stylus, etc.), one or more output devices 734 (e.g., speaker), one or more storage devices 735, various types of storage medium 736.

The system bus 740 link a wide variety of subsystems. As understood by those skilled in the art, a "bus" refers to a plurality of digital signal lines serving a common function. The system bus 740 can be any of several types of bus structures including a memory bus, a peripheral bus, and a local bus using any of a variety of bus architectures. By way of example and not limitation, such architectures include the Industry Standard Architecture (ISA) bus, Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

Processor(s) 701 (also referred to as central processing units, or CPUs) optionally contain a cache memory unit 702 for temporary local storage of instructions, data, or computer addresses. Processor(s) 701 are coupled to storage devices including memory 703. Memory 703 includes random access memory (RAM) 704 and read-only memory (ROM) 705. As is well known in the art, ROM 705 acts to transfer data and instructions uni-directionally to the processor(s) 701, and RAM 704 is used typically to transfer data and instructions in a bi-directional manner. Both of these types of memories can include any suitable of the computer-readable media described below.

A fixed storage 708 is also coupled bi-directionally to the processor(s) 701, optionally via a storage control unit 707. It provides additional data storage capacity and can also include any of the computer-readable media described below. Storage 708 can be used to store operating system 709, EXECs 710, application programs 712, data 711 and the like and is typically a secondary storage medium (such as a hard disk) that is slower than primary storage. It should be appreciated that the information retained within storage 708, can, in appropriate cases, be incorporated in standard fashion as virtual memory in memory 703.

Processor(s) 701 is also coupled to a variety of interfaces such as graphics control 721, video interface 722, input interface 723, output interface 724, storage interface 725, and these interfaces in turn are coupled to the appropriate devices. In general, an input/output device can be any of: video displays, track balls, mice, keyboards, microphones, touch-sensitive displays, transducer card readers, magnetic or paper tape readers, tablets, styluses, voice or handwriting recognizers, biometrics readers, or other computers. Processor(s) 701 can be coupled to another computer or telecommunications network 730 using network interface 720. With such a network interface 720, it is contemplated that the CPU 701 can receive information from the network 730, or can output information to the network in the course of performing the above-described method. Furthermore, method embodiments of the present disclosure can execute solely upon CPU 701 or can execute over a network 730 such as the Internet in conjunction with a remote CPU 701 that shares a portion of the processing.

According to various embodiments, when in a network environment, i.e., when computer system 700 is connected to network 730, computer system 700 can communicate with other devices that are also connected to network 730. Communications can be sent to and from computer system 700 via network interface 720. For example, incoming communications, such as a request or a response from another device, in the form of one or more packets, can be received from network 730 at network interface 720 and stored in selected sections in memory 703 for processing. Outgoing communications, such as a request or a response to another device, again in the form of one or more packets, can also be stored in selected sections in memory 703 and sent out to network 730 at network interface 720. Processor(s) 701 can access these communication packets stored in memory 703 for processing.

In addition, embodiments of the present disclosure further relate to computer storage products with a computer-readable medium that have computer code thereon for performing various computer-implemented operations. The media and computer code can be those specially designed and constructed for the purposes of the present disclosure, or they can be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter. Those skilled in the art should also understand that term "computer readable media" as used in connection with the presently disclosed subject matter does not encompass transmission media, carrier waves, or other transitory signals.

As an example and not by way of limitation, the computer system having architecture 700 can provide functionality as a result of processor(s) 701 executing software embodied in one or more tangible, computer-readable media, such as memory 703. The software implementing various embodiments of the present disclosure can be stored in memory 703 and executed by processor(s) 701. A computer-readable medium can include one or more memory devices, according to particular needs. Memory 703 can read the software from one or more other computer-readable media, such as mass storage device(s) 735 or from one or more other sources via communication interface. The software can cause processor(s) 701 to execute particular processes or particular parts of particular processes described herein, including defining data structures stored in memory 703 and modifying such data structures according to the processes defined by the software. In addition or as an alternative, the computer system can provide functionality as a result of logic hardwired or otherwise embodied in a circuit, which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

We claim:

1. A method for decoding in a decoding device a bitstream comprising at least three layers or views, each including at least one picture P0, P1 and P2, respectively, wherein, P2 is predicted at least in part from P1, and P1 is predicted at least in part from P0 without any data indicating explicit inter-layer prediction data in the bitstream, wherein P2 is predicted at least in part from P0 in the presence of explicit inter-layer prediction, the method comprising:
 decoding with a decoder a slice segment header of the picture P2; and
 reconstructing at least one sample of the picture P2 using information from the picture P0 as a predictor,
 wherein:
 the slice segment header of the picture P2 conditionally includes at least one syntax element inter_layer_pred_layer under the condition of the presence of explicit inter-layer prediction;
 the syntax element inter_layer_pred_layer is indicative of the use of information from the picture P0 as a predictor, and
 based on this indication, a reference to the picture P0 is included in a reference picture list when decoding the picture P2.

2. The method of claim 1, wherein a flag inter_layer_pred_enabled_flag is set to 1 as a required condition for the presence of inter-layer prediction.

3. The method of claim 1, wherein a presence of a syntax element inter_layer_pred_layer_idc indicates an explicit inter layer prediction relationship.

4. The method of claim 2, wherein the flag inter_layer_pred_enabled_flag is a syntax element and part of the slice segment header.

5. The method of claim 1, wherein the slice segment header comprises a syntax element num_inter_layer_ref_pic_minus1 indicative of the number of reference picture list entries that are used for inter-layer prediction relationships.

6. The method of claim 5, further comprising:
 using explicit reference layer prediction when a value of the syntax element num_inter_layer_ref_pic_minus1 is not equal to a number of reference pictures used by inter-layer prediction NumDirectRefLayers.

7. The method of claim 1, wherein the presence of the syntax element inter_layer_pred_layer is conditioned on a flag max_one_active_ref_layer_flag located in a Video Parameter Set (VPS).

8. The method of claim 6, wherein a number of inter_layer_pred_layer_idc syntax elements is NumActiveRefLayerPics, and NumActiveRefLayerPics is derived from a combination of at least two of the NumDirectRefLayers, all_ref_layers_active_flag, inter_layer_pred_enabled_flag and max_one_active_ref_layer_flag.

9. The method of claim 1, wherein inter_layer_pred_layer_idc is coded in a fixed length binary code, wherein the length of the fixed length binary code derived from a NumberActiveRefLayerPics.

10. The method of claim 1, further comprising reconstructing at least one treeblock of P2, wherein the treeblock of P2 is predicted at least in part from P0, and a corresponding prediction relationship is part of a treeblock header associated with the treeblock of P2.

11. The method of claim 10 further comprising reconstructing at least one treeblock of P2, wherein the treeblock of P2 is further predicted at least in part from P1 and a corresponding prediction relationship is part of a treeblock header associated with the treeblock of P2.

12. The method of claim 10 further comprising reconstructing at least one treeblock of P2, wherein the at least one treeblock of P2 is further predicted at least in part from P1 and no inter layer prediction information is present in the treeblock header associated with the treeblock of P2 that relates to a tree block of an inter layer prediction relationship between P2 and P1.

13. A system for decoding a bitstream comprising at least three layers or views, each including at least one picture P0, P1 and P2, respectively, wherein, P2 is predicted at least in part from P1, and P1 is predicted at least in part from P0 without any data indicating explicit inter-layer prediction data in the bitstream, wherein P2 is predicted at least in part from P0 in the presence of explicit inter-layer prediction,
 a decoder (comprising a combination of hardware and software) configured to:
 decode a slice segment header of the picture P2; and
 reconstruct at least one sample of the picture P2 using information from the picture P0 as a predictor,
 wherein:
 the slice segment header of the picture P2 conditionally includes at least one syntax element inter_layer_pred_layer under the condition of the presence of explicit inter-layer prediction;
 the syntax element inter_layer_pred_layer is indicative of the use of information from the picture P0 as a predictor, and
based on this indication, a reference to the picture P0 is included in a reference picture list when decoding the picture P2.

14. The system of claim 13, wherein a flag inter_layer_pred_enabled_flag is set to 1 as a required condition for the presence of inter-layer prediction.

15. The system of claim 13, wherein a presence of a syntax element inter_layer_pred_layer_idc indicates an explicit inter layer prediction relationship.

16. The system of claim 14, wherein the flag inter_layer_pred_enabled_flag is a syntax element and part of the slice segment header.

17. The system of claim 13, wherein the slice segment header comprises a syntax element num_inter_layer_ref_pic_minus1 indicative of the number of reference picture list entries that are used for inter-layer prediction relationships.

18. The system of claim 17, wherein the decoder is further configured to:
 use explicit reference layer prediction when a value of the syntax element num_inter_layer_ref_pic_minus1 is not equal to a number of reference pictures used by inter-layer prediction NumDirectRefLayers.

19. The system of claim 13, wherein the presence of the syntax element inter_layer_pred_layer is conditioned on a flag max_one_active_ref_layer_flag located in a Video Parameter Set (VPS).

20. The system of claim 18, wherein a number of inter_layer_pred_layer_idc syntax elements is NumActiveRefLayerPics, and NumActiveRefLayerPics is derived from a combination of at least two of the NumDirectRefLayers, all_ref_layers_active_flag, inter_layer_pred_enabled_flag and max_one_active_ref_layer_flag.

21. The system of claim 13, wherein inter_layer_pred_layer_idc is coded in a fixed length binary code, wherein the length of the fixed length binary code derived from a NumberActiveRefLayerPics.

22. The system of claim 13, wherein the decoder is further configured to: reconstruct at least one treeblock of P2, wherein the treeblock of P2 is predicted at least in part from P0, and a corresponding prediction relationship is part of a treeblock header associated with the treeblock of P2.

23. The system of claim 22 wherein the decoder is further configured to: reconstruct at least one treeblock of P2, wherein the treeblock of P2 is further predicted at least in part from P1 and a corresponding prediction relationship is part of a treeblock header associated with the treeblock of P2.

24. The system of claim 22 wherein the decoder is further configured to: reconstruct at least one treeblock of P2, wherein the at least one treeblock of P2 is further predicted at least in part from P1 and no inter layer prediction information is present in the treeblock header associated with the treeblock of P2 that relates to a tree block of an inter layer prediction relationship between P2 and P1.

25. A non-transitory computer readable medium comprising a set of exectuable instructions to direct a processor to perform the method of claim 1.

* * * * *